May 8, 1962 M. C. PRYMEK 3,033,345
COUPLING AND TRANSFERRING APPARATUS
Filed April 8, 1960 4 Sheets-Sheet 1
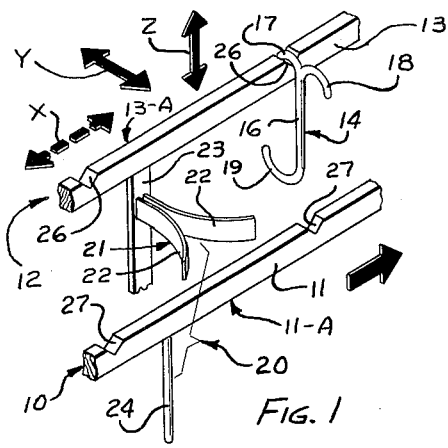
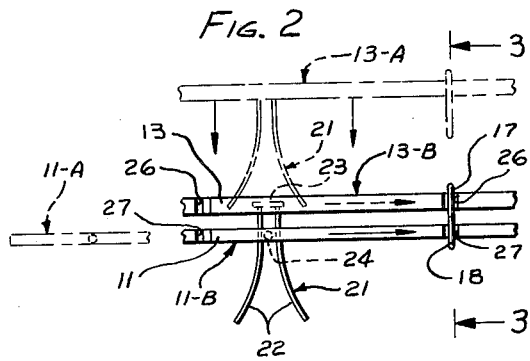
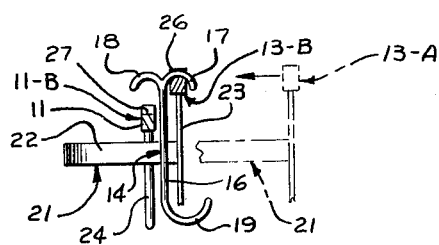
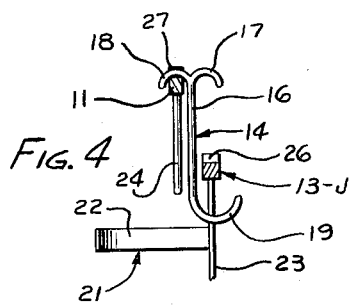
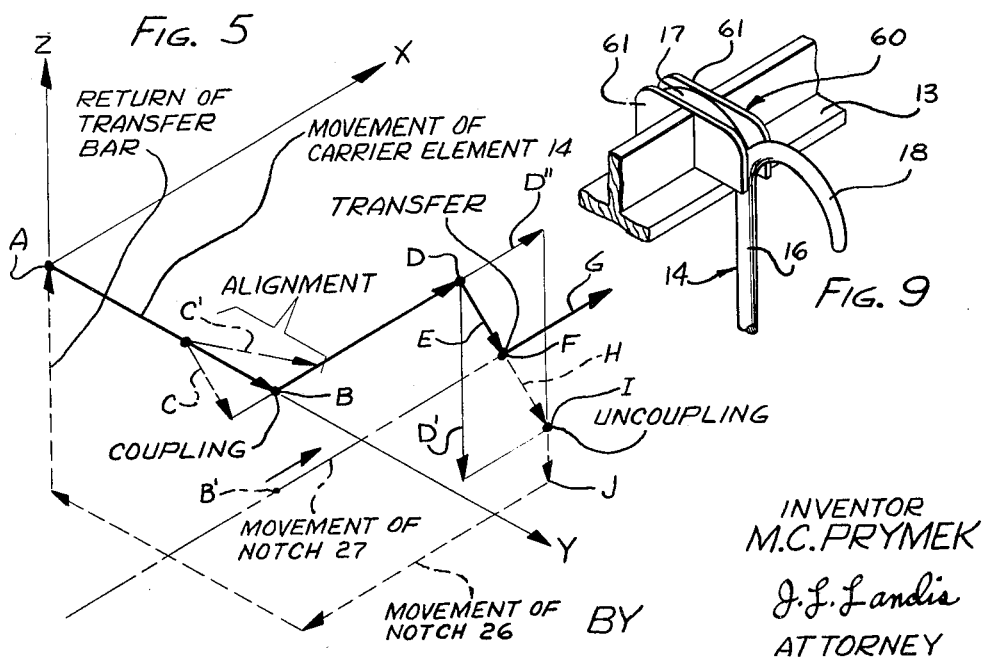
INVENTOR
M.C. PRYMEK
J.L. Landis
BY ATTORNEY May 8, 1962   M. C. PRYMEK   3,033,345
COUPLING AND TRANSFERRING APPARATUS
Filed April 8, 1960   4 Sheets-Sheet 2
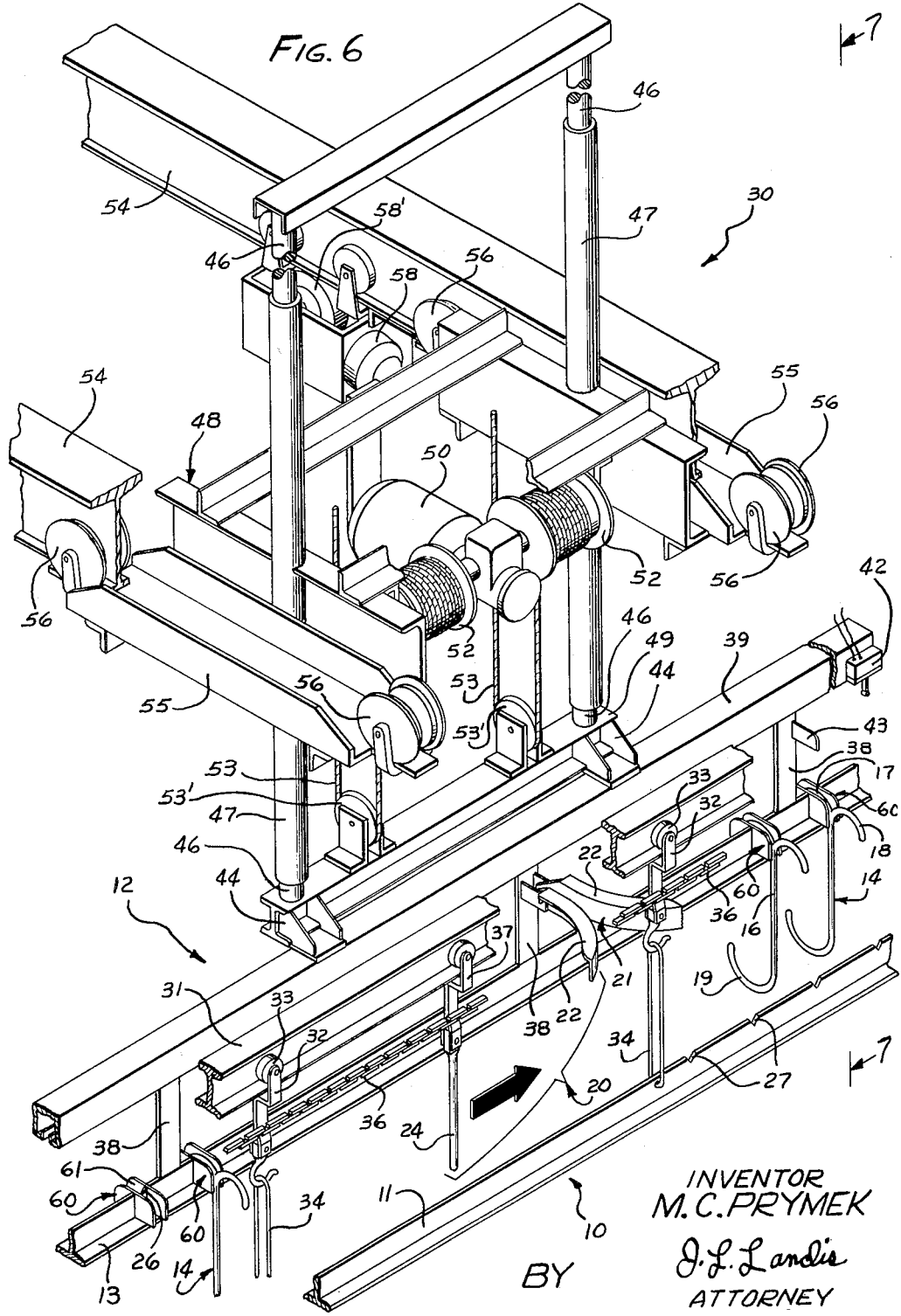
INVENTOR
M. C. PRYMEK
BY J. L. Landis
ATTORNEY May 8, 1962 — M. C. PRYMEK — 3,033,345
COUPLING AND TRANSFERRING APPARATUS
Filed April 8, 1960 — 4 Sheets-Sheet 3

INVENTOR
M.C. PRYMEK
BY J. L. Landis
ATTORNEY

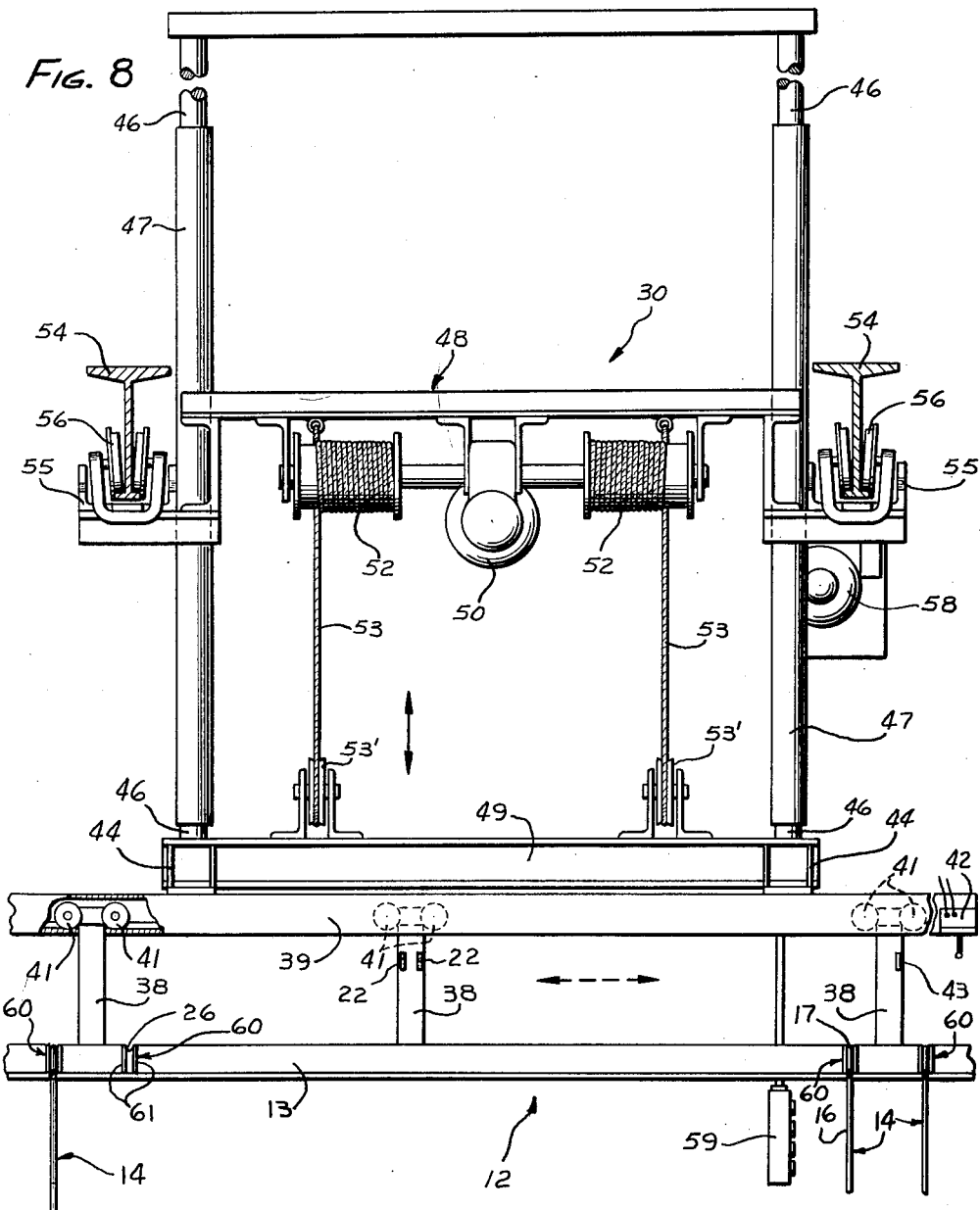

United States Patent Office 3,033,345
Patented May 8, 1962

3,033,345
COUPLING AND TRANSFERRING APPARATUS
Milton C. Prymek, Berwyn, Ill., assignor to Western Electric Company, Incorporated, New York, N.Y., a corporation of New York
Filed Apr. 8, 1960, Ser. No. 20,945
7 Claims. (Cl. 198—75)

The present invention relates generally to coupling and transferring apparatus, and more particularly to apparatus for transferring a work-supporting carrier element to and from a continuously moving conveyor. Accordingly, the general objects of the invention are to provide new and improved apparatus of such character.

In the conveyorized manufacture of various types of equipment, overhead conveyors of one type or another are utilized to transport a succession of articles, such as piece parts, from one operating or assembling station to another. In many of such conveyors, the work is suspended from carrier elements having hooks at the upper ends thereof that are received in notches formed along a load bar constituting a portion of the conveyor.

Accordingly more specific objects of the invention are to provide new and improved apparatus for loading and unloading such carrier elements from the load bars of overhead conveyor units automatically and without manual lifting while the load bar is in motion.

Two important reasons for attaining these objects are (1) to avoid the shut-down time which would otherwise be required in loading and unloading the conveyor, and (2) to avoid manual handling and lifting, particularly where the load is heavy and where the load bar on which the carrier is to be placed is in motion.

With the foregoing and other objects in view, the invention constitutes apparatus for coupling a movable member to a moving member in aligned relationship. According to certain aspects of the invention, a rod-like element is secured to a first one of the members, and a receiving element is secured to the second member and defines a retaining aperture with a flared opening designed for receiving and retaining the rod-like element. In order to couple the members, they are moved relatively together transversely of the direction of movement of the moving member so that the rod-like element is guided by the flared opening, received by the receiving element, and retained by the retaining aperture. The movable member is then coupled for movement with the moving member.

The moving step is initiated at a time when the rod-like element is approximately aligned with the flared opening in the receiving element, the flared opening facilitating the reception of the rod-like element into the retaining aperture and providing for precise alignment of the two members in the direction of movement. Subsequently, the two members are moved relatively apart to disengage the rod-like element and the receiving element and thus uncouple the members.

According to other aspects of the invention, there is provided apparatus for transferring a work-supporting carrier element to and from a continuously moving conveyor. The carrier element is formed with a pair of hooks at the upper end thereof that project in opposite directions, and the conveyor is designed for receiving one hook of the carrier element. A transfer member or means is provided for receiving the second one of the hooks of the carrier element. When it is desired to unload or load the conveyor, the transfer member is first coupled and aligned with the conveyor while the conveyor is moving, preferably utilizing the coupling apparatus described in the preceding paragraph. After the coupling and aligning operations, the transfer member is raised or lowered to unload or load the conveyor respectively by lifting up on the second hook when the conveyor was previously loaded or by moving the first hook down onto the conveyor when the conveyor was previously unloaded. After the transfer operation, the transfer element is uncoupled.

Other objects, advantages and aspects of the invention will become apparent from the following detailed description of specific embodiments and examples thereof, when taken in conjunction with the appended drawings, in which:

FIG. 1 is a schematic perspective view of a simplified apparatus illustrating the principles of the invention;

FIG. 2 is a top plan view of the apparatus illustrated in FIG. 1, showing certain elements moved to a different operating position;

FIG. 3 is a vertical sectional view taken generally along the line 3—3 of FIG. 2;

FIG. 4 is a view similar to FIG. 3, but showing a later stage in the operation;

FIG. 5 is a graphical, three-dimensional representation of the movements of various elements during a loading operation according to the invention;

FIG. 6 is a perspective view, with portions broken away, of a complete apparatus according to a preferred embodiment of the invention;

FIG. 8 is a fragmentary front elevation of a transfer and crane mechanism, taken generally along the line 8—8 of FIG. 7; and FIG. 9 is an enlarged view of a portion of a transfer bar, showing particularly a mechanism for preventing any rotational movement of a carrier element.

Figure 7:
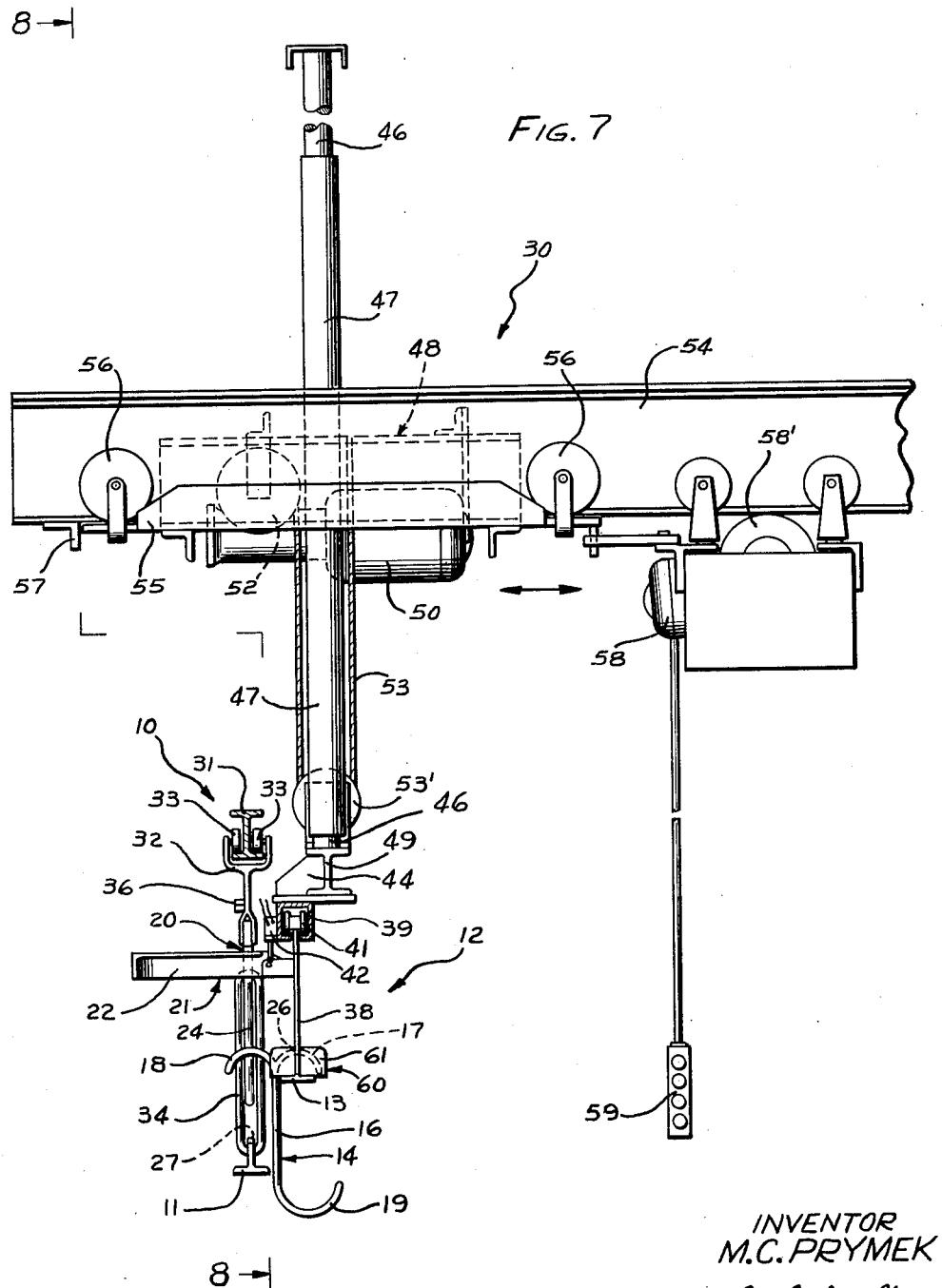
FIG. 7 is a right side elevation of the apparatus illustrated in FIG. 6 with portions broken away, taken in the direction of the arrows 7—7 in FIG. 6 and showing elements in a coupled position.

Referring now in detail to the drawings, and particularly to FIGS. 1 through 4, the numeral 10 designates generally an overhead conveyor unit having a load bar 11, and the numeral 12 designates generally a transfer unit having a transfer bar 13. The transfer unit 12 is designed for loading and unloading a carrier element designated generally by the numeral 14 onto and off of the load bar 11 while the load bar 11 is moving from left to right as viewed in FIGS. 1 and 2. The carrier element 14 is formed with a shank portion 16 and a pair of hooks 17 and 18 projecting in opposite directions at the upper end of the shank 16. The lower end of the carrier element 14 is fitted in any conventional manner, as with a bent hook 19, to carry articles or baskets containing articles to and from various manufacturing or assembling stations.

FIGS. 1 through 5 exemplify the process of loading one carrier element 14 onto the load bar 11, it being understood as will be described in more detail hereinafter that the carrier element 14 may be unloaded from the load bar 11 by a substantially opposite process. The transfer bar 13 is free to move in the horizontal direction of movement of the load bar 11, as indicated by the dotted arrow X; may be moved horizontally toward and away from the load bar 11 in a direction transverse to the direction of movement of the load bar 11, as indicated by the arrow Y; and may also be moved vertically with respect to the load bar 11, as indicated by the arrow Z. During the transfer operation, the transfer bar 13 is temporarily coupled to the load bar 11 for movement therewith in the X direction and is also aligned therewith in the X direction. For this purpose, a mechanism designated generally by the numeral 20 is provided for accomplishing the coupling and aligning operations.

In the simplified apparatus illustrated in FIGS. 1 through 4, the coupling and aligning mechanism 20 includes a fork, designated generally by the numeral 21, formed with spaced, divergent furcations 22—22 and is mounted on a vertical plate 23 which in turn is secured to and depends from the transfer bar 13; and a rod 24 secured to the moving load bar 11. The divergent furcations 22—22 project from the plate 23 toward the conveyor 10 as best seen in FIG. 1.

The rod 24 is of such size, as best illustrated in FIG. 2, as to permit close reception between the spaced furcations 22—22 of the fork 21 at the narrowest point. When the transfer bar 13 and the load bar 11 are to be coupled, the fork 21 and rod 24 are mutually engaged both to couple the transfer bar 13 to the load bar 11 for movement therewith and to align the transfer bar 13 with respect to the load bar 11 in the X direction since, as previously mentioned, the transfer bar 13 is free to move in that direction.

In the situation illustrated in the drawings, where the transfer bar 13 is to load the carrier element 14 onto the load bar 11, the rear hook 17 of the carrier element 14 is initially received in one of a plurality of notches 26—26 formed at intervals along the transfer bar 13. The front hook 18 is free at this time and projects transversely toward the advancing load bar 11. The front hook 18 is ultimately received in one of a plurality of notches 27—27 formed at intervals along the load bar 11 at such a point (as viewed in FIG. 2) that, when the rod 24 and fork 21 are engaged, the notches 26 and 27 lie in a common vertical plane transverse to the direction of movement of the load bar 11, which plane is parallel to the Y—Z plane depicted in FIG. 5. The transfer operation will be described with respect to only one carrier element 14 shown at the right of FIGS. 1 and 2, it being understood that any number of carrier elements may be transferred at the same time so long as an alignable set of notches 26 and 27 is provided.

In the following description of the loading operation, as depicted graphically in FIG. 5, the letter "A" designates a starting point in the operation where the transfer bar 13 occupies a position 13–A, shown in solid lines in FIG. 1 and in phantom lines in FIGS. 2 and 3, and where the load bar 11 moving along the X axis is at an approximate position 11–A. In FIG. 5, the solid vector designates the general path of movement of the carrier element 14 throughout the operation (coincident with the notch 26 during the first part of the operation and coincident with the notch 27 thereafter), the dotted vector designates the path of movement of the notch 26 after the carrier element 14 has been transferred, and the phantom vector designates the path of movement of the notch 27 previous to the time that it is engaged by the hook 18.

At the initial position 13–A, the transfer bar 13 is parallel to the load bar 11 and is positioned with the notch 26 in a horizontal plane somewhat above that of the notch 27 of the load bar 11. With this arrangement, as best illustrated in FIG. 3, the transfer bar 13 may be moved horizontally along the Y axis toward the load bar 11 to a position where the free hook 18 overlies the notch 27 in the load bar 11 out of contact therewith. As best illustrated in FIG. 2, the transfer bar 13 in the original position 13–A is a sufficient distance to the rear of the path of movement of the load bar 11 that the fork 21 is positioned a short distance to the rear of the path of movement of the rod 24.

With this initial positioning of the transfer bar 13, the load bar 11 moves continuously to the right (FIG. 2) until a point B' (FIG. 5) is reached where the rod 24 is in a position of approximate alignment with the fork 21; that is, where the rod 24 is opposite to the space between the divergent furcations 22—22 of the fork 21. When this alignment occurs, the transfer bar 13 is moved rapidly in the Y direction forward as viewed in FIG. 2 (to the left as viewed in FIG. 3) to a position 13–B where the rod 24 is received and retained between the furcations 22—22 of the fork 21 to couple the transfer bar 13 to the load bar 11. During this movement, vector $\overline{AB}$ in FIG. 5, the divergent furcations 22—22 facilitate the reception of the rod 24 by the fork 21 so that the coupling is attained even in cases where the rod 24 is considerably misaligned with the fork 21 at the time when the transfer bar 13 is moved forward.

The divergent furcations 22—22 also provide for precise alignment of the transfer bar 3 with the load bar 11 in the direction of movement X. This alignment is effected, since the transfer bar 13 is free to move in the X direction, because the moving rod 24 cams the fork 21 to the left or right if not precisely aligned as the rod 24 becomes seated at the base of the fork 21. This adjustment is usually necessary and is indicated by the vectors C and C' in FIG. 5. When this adjustment has been made and the fork 21 and rod 24 are fully engaged, the notches 26 and 27 are precisely aligned as viewed in FIG. 2 and the free hook 18 overlies the notch 27 in direct alignment therewith.

After the fork 21 and rod 24 have been engaged, the transfer bar 13 is coupled to the load bar 11 for movement in the X direction so that the precise alignment of the notches 26 and 27 is preserved according to a vector $\overline{BD}$ in FIG. 5. At a point D (which may be almost any point after the coupling point B), the transfer bar 13 is lowered with respect to othe load bar 11. The transfer bar 13 tends to move vertically downward according to a vector D', but also tends to move in the X direction according to a vector D'' because of the coupling, so that the net motion is a downwardly angling vector E. The transfer bar 13 is moved downward in this manner until a point F is reached, where the notch 26 passes below the notch 27. When this occurs, the forward hook 18 lodges in the notch 27 while the notch 26 lowers away from the rear hook 17, so that the carrier element 14 is effectively transferred from the transfer bar 13 to the load bar 11.

Subsequent to the transfer operation, the carrier element 14 is borne by the load bar 11 and moves forward according to the solid vector G constituting a continuation of the phantom vector designating the path of movement of the notch 27. The transfer bar 13 preferably continues to move downward according to a dotted vector H until a point I is reached, where the fork 21 slides off the free lower end of the rod 24 and the coupling between the transfer bar 13 and the load bar 11 is disengaged, at which time the load bar 13 discontinues movement in the X direction. Preferably, the transfer bar 13 continues to move downward a short additional distance, to a point J, to assure disengagement and freedom of the transfer bar 13 to move independently of the load bar 11. In FIG. 4, the transfer bar 13 is illustrated at the position J, and is designated by the character 13–J, where it is both unloaded and uncoupled. The transfer bar 13 is next moved in the X, Y and Z directions back to the starting point A, or to some other point where it is reloaded with carrier elements 14—14 for a succeeding transfer operation.

When it is desired to utilize the transfer bar 13 to unload a carrier element 14 from the load bar 11, the operation is substantially the same except that the transfer bar 13 is originally positioned with its notch 26 in a horizontal plane below that of the notch 27 on the load bar 11. In this case, the transfer bar 13 is moved upward after the fork 21 and rod 24 have been engaged so that the notch 26 engages the rearward hook 17 and lifts the carrier element 14 off of the load bar 11. With the construction illustrated in FIGS. 1 through 4, the transfer bar 13 must be moved rearward, to the right as viewed in FIGS. 3 and 4, after the carrier element 14 has been lifted off of the load bar 11 in order to disengage the coupling between the transfer bar 13 and the load bar 11, since the rod 24 is shown as projecting downward from the load bar 11. In the event that the coupling mechanism 20 were to be urged only to unload a particular load bar 11, then the rod 24 could extend upward therefrom to facilitate the disengagement. It would also be possible to provide two rods, such as 24, one extending in each direction.

While it should be apparent that the various synchronized movements of the transfer bar 13 in the Y and Z directions may be accomplished manually, it is preferred to provide a suitable power-driven mechanism for accomplishing these movements quickly and easily, such as an overhead crane unit designated generally by the numeral 30 and illustrated in FIGS. 6, 7 and 8. FIGS. 6 and 7 also illustrate one generally conventional type of overhead conveyor unit 10 that may be used for advancing a plurality of load bars 11—11 in spaced relationship to each other.

The conveyor 10 includes an overhead I-beam or rail 31 on which a number of trolleys 32—32 are movably supported, each trolley 32 including a pair of wheels 33—33 that are free to roll along the rail 31. The trolleys 32—32 support a plurality of load bars 11—11 (only one of which is shown) at spaced intervals along the rail 31 by means of a plurality of steel rings 34—34. Each load bar 11, in cross-section, constitutes an inverted T having the notches 27—27 cut along the upper surface thereof. The trolleys 32—32 are driven by a continuously moving chain 36 in engagement therewith to move all of the load bars 11—11 continuously from left to right as viewed in FIG. 6. A coupling rod 24 is mounted on an additional trolley 37 associated with each load bar 11 for synchronized movement with that load bar. It should be noted that the rod 24 may be mounted either on the load bar 11 or, generally, on the conveyor 10 so long as a rod 24 moves synchronously with each load bar 11.

The overhead crane unit 30 is likewise of a generally conventional type, including a plurality of trolleys 38—38 for mounting the transfer bar 13 to a rail 39 for free movement to the right and left as viewed in FIGS. 6 and 8. The rail 39 is formed with an inverted U-shaped cross-section with upwardly extending interior flanges designed for receiving a plurality of rollers 41—41 (FIGS. 7 and 8) of the trolleys 38—38 for free rolling movement along the rail 39. The trolleys 38—38 constitute generally flat plates, which are secured at their lower ends to the transfer bar 13. A safety limit switch 42 is mounted near the right end (FIGS. 6 and 8) of the rail 39 and is designed to be closed by an actuator 43, which is secured to the right trolley 38, to stop the conveyor 10 if the fork 21 has not been disengaged from the rod 24 associated with each load bar 11 by the time that the rollers 41—41 reach the right end of the rail 39.

The rail 39 may be moved up and down to move the transfer bar 13 in corresponding fashion and, to this end, is secured by means of a pair of brackets 44—44 to a pair of shafts 46—46, which are free to move vertically in a pair of guide sleeves 47—47. The sleeves 47—47 constitute a portion of a crane frame designated generally by the numeral 48 and are stationary with respect to vertical movement. An I-beam 49 is secured between the brackets 44—44 and may be raised and lowered in conventional fashion by means of a drive motor 50 that is mounted to the crane frame 48. The motor 50 is designed to rotate a pair of winding drums 52—52 so as to raise or lower the I-beam 49 on a pair of steel ropes 53—53. Each rope 53 has one end secured to the frame 48, and extends downward therefrom so as to pass around one of a pair of pulleys 53'—53', which are mounted on the I-beam 49; and then extends upward and is wound around one of the drums 52—52.

The crane frame 48 is supported for forward movement (to the right or left as viewed in FIG. 7) on a pair of fixed crane rails 54—54 constituting the main supporting structure for the crane 30. In order to accomplish this movement, a pair of end trucks 55—55 are provided, one of which is secured to each end of the frame 48 and each of which carries a trolley 56 at each end for rolling movement along the crane rails 54—54. A stop 57 (FIG. 7) is provided for limiting the forward movement to the amount required to engage the fork 21 with the rod 24. The crane frame 30 is moved to the right and left, as viewed in FIG. 7, in conventional fashion by means of a motor 58, which rotates a rubber tire 58' that is in pressing engagement with the under surface of one of the crane rails 54—54 and is connected to one of the end trucks 55—55 so as to move the crane frame 48.

A 4-button combined push-button switch 59 is provided having controls for actuating the drive motors 50 and 58 to move the transfer bar 13 up, down, forward or reverse as needed in carrying out the transfer operation previously described with respect to each advancing load bar 11. While a manually controlled switch 59 has been illustrated for moving the transfer bar 13, various movement-sensitive limit switches and/or proximity switches could be utilized to accomplish each movement automatically as soon as the last movement has been completed.

It is preferred to provide means, designated generally by the numeral 60, on at least the initially loaded one of the transfer and load bar elements 13 and 11 for precluding any movement of the carrier element 14 with respect to the initially loaded one of the transfer and load bar elements until after the transfer operation has been completed, thus insuring precise alignment of the free hook 18 or 17 with the notch 27 or 26 in the unloaded one of the transfer and load bar elements 13 or 11 respectively. In the specific embodiment illustrated in FIG. 9 wherein the transfer bar 13 is initially loaded, the movement-precluding means 60 includes a pair of spaced plates 61—61 secured to the transfer bar 13 on opposite sides of each notch 26. The plates 61—61 are spaced apart a distance only slightly greater than the cross-sectional dimension (diameter) of the hook 17 and have sufficient frontal area to engage substantial portions of the hook 17 (preferably, as indicated in FIG. 9, to engage substantially all of the hook 17) so as to preclude any rotational or swinging movement of the carrier element 14 and to further preclude any other movement of the carrier element 14 relative to the transfer bar 13 until after the transfer operation has been completed.

While various specific examples and embodiments of the invention have been described in detail hereinabove, it will be obvious that various modifications may be made from the specific details described without departing from the spirit and scope of the invention.

For example, while the foregoing description has been directed particularly to the transferring of carrier elements to and from a moving conveyor, it is apparent that the coupling methods and apparatus may be used to couple together two conveyors and, broadly, to couple a movable member (exemplified by the transfer bar 13) to a moving member (such as the load bar 11) in aligned relationship. Generically, the fork 21 with divergent furcations 22—22 constitutes a receiving element for a rod-like element (the rod 24), the receiving element having a receiving aperture with a flared opening for receiving and retaining the rod-like element to couple the movable member to the moving member. It is further apparent that the receiving element or fork could be mounted on the moving member with the rod mounted on the movable member, and that either member might be moved toward or away from the other to couple and uncouple the members.

What is claimed is:

1. Apparatus for transferring a carrier element designed for supporting work to and from a continuously moving conveyor, the carrier element having a pair of hooks at the upper end thereof that project in opposite directions, the conveyor being designed for receiving one hook of the carrier element; which apparatus comprises transfer means for receiving the second one of the hooks of the carrier element, means for temporarily coupling said transfer means to the conveyor while the conveyor is moving and for aligning said transfer means with the conveyor in the direction of movement of the conveyor, and means for raising and lowering said transfer means with respect to the conveyor while moving with the conveyor to unload and load the conveyor respectively by lifting upon the second hook when the conveyor was previously loaded and by moving the first hook down onto the conveyor when the conveyor was previously unloaded; said raising and lowering means being operated after the engagement of said coupling and aligning means, and said coupling and aligning means being disengaged after the transfer operation.

2. Apparatus for transferring a carrier element designed for supporting work to and from a continuously moving horizontal conveyor, the carrier element having a shank portion and a pair of hooks projecting in opposite directions at the upper end of the shank, the conveyor having a notched load bar designed for receiving one hook of the carrier element; which transferring apparatus comprises a crane; a notched transfer bar carried by said crane and designed for receiving the other hook of the carrier element; a fork having divergent furcations, said fork being mounted on said crane for movement with said transfer bar with the furcations of said fork projecting horizontally toward the moving conveyor; a vertical rod mounted on the moving conveyor and of such size as to permit close reception between the furcations of said fork; means constituting a part of said crane for moving said transfer bar transversely of the direction of movement of the conveyor into closely spaced parallel relationship to the load bar, said fork and rod being so arranged that during this movement of said transfer bar said fork receives said rod between the furcations thereof and retains said rod therebetween, the divergent furcations of said fork facilitating the reception of said rod; means constituting a part of said crane for permitting free horizontal movement of said transfer bar in the direction of movement of the load bar, the retention of said rod by said fork coupling said transfer bar to the load bar for movement therewith and the divergent furcations of said fork providing for precise alignment of said transfer bar with the load bar in the direction of movement, said rod and said fork being further arranged so that when said transfer bar is aligned with the load bar the notches in these elements lie in a common vertical plane transverse to the direction of movement of the conveyor; means constituting a part of said crane for moving said transfer bar vertically with respect to the load bar, said vertical moving means being initially operated to move said transfer bar to a position where the notch thereof is in a different horizontal plane from that of the load bar, the carrier element having one hook engaged by one of the transfer and load bar elements with the transfer bar being so positioned vertically that the other hook is free and overlies the unloaded one of the transfer and load bar elements after said fork and rod have been engaged, said vertical moving means being operated after the engagement of said fork and rod while said transfer bar is moving with the load bar to move said transfer bar in such vertical direction with respect to the load bar that the notch in said transfer bar passes the notch in the load bar whereby the hook which was free becomes engaged by the previously unloaded one of the transfer and load bar elements and the hook which was formerly engaged becomes free of the previously loaded one of the transfer and load bar elements.

3. The apparatus as recited in claim 2, wherein means are provided on at least the initially loaded one of the transfer and load bar elements for precluding any movement of the carrier element with respect to the initially loaded one of the transfer and load bar elements until after the transfer operation has been completed, whereby precise vertical alignment of the free hook with the notch in the initially unloaded one of the transfer and load bar elements is insured.

4. The apparatus as recited in claim 3, wherein the movement-precluding means comprises a pair of spaced plates secured to the initially loaded one of the transfer and load bar elements on opposite sides of the notch, said plates being spaced apart a distance only slightly greater than the cross-sectional dimension of the hook and having sufficient frontal area to engage substantial portions of the hook.

5. The apparatus as recited in claim 2, wherein the rod has a free end and is of such length that the fork slides off of the free end of said rod shortly after the transfer operation has been completed so as to disengage the temporary coupling between the load bar and the transfer bar.

6. The apparatus as recited in claim 2, wherein means are provided on the crane for positively stopping the movement of the transfer bar toward the load bar at a point where the rod is received at a narrow base portion of the fork.

7. The apparatus as recited in claim 2, wherein safety means are provided for stopping the movement of the conveyor in the event that the transfer operation has not been completed and the fork disengaged from the rod within a specified safe time based on the conveyor speed and the maximum length of the path of free horizontal movement of the transfer bar with the load bar.

References Cited in the file of this patent
UNITED STATES PATENTS

| 1,740,743 | Oettle | Dec. 24, 1929 |
| 2,731,160 | Maier | Jan. 17, 1956 |
| 2,771,175 | Da Costa | Nov. 20, 1956 |